United States Patent [19]

Mikofalvy et al.

[11] 4,098,978

[45] Jul. 4, 1978

[54] PROCESS FOR EMULSION POLYMERIZATION OF VINYLIDENE HALIDES AND PRODUCT THEREOF

[75] Inventors: Bela Kalman Mikofalvy, Avon Lake; James Wilson Turner, Bay Village, both of Ohio

[73] Assignee: The B. F. Goodrich Company, Akron, Ohio

[21] Appl. No.: 630,981

[22] Filed: Nov. 12, 1975

[51] Int. Cl.² .................. C08F 2/26; C08F 114/06
[52] U.S. Cl. .................. 526/81; 260/23 AR; 260/23 XA; 260/29.6 F; 260/29.6 N; 260/29.6 MN; 260/29.6 RB; 260/29.6 Z; 526/216; 526/225; 526/229; 526/344.2
[58] Field of Search ............. 526/216, 81, 229, 225; 260/29.6 F, 29.6 Z, 29.6 N, 29.6 M, 29.6 Q, 29.6 MN, 29.6 RB, 23 XA, 23 AR

[56] References Cited

U.S. PATENT DOCUMENTS

| | | | |
|---|---|---|---|
| 3,255,132 | 6/1966 | Reinecke | 526/216 X |
| 3,258,437 | 6/1966 | Peters | 526/216 X |
| 3,370,028 | 2/1968 | De Wald | 526/216 X |
| 3,740,368 | 6/1973 | Sturt | 526/216 X |
| 3,830,883 | 8/1974 | Sturt | 526/216 |
| 3,895,000 | 7/1975 | Mathieu | 526/216 X |

FOREIGN PATENT DOCUMENTS

| | | | |
|---|---|---|---|
| 699,016 | 10/1953 | United Kingdom | 526/216 |

*Primary Examiner*—Christopher A. Henderson, Jr.
*Attorney, Agent, or Firm*—Charles A. Crehore

[57] ABSTRACT

At least one vinylidene halide monomer is polymerized in an aqueous emulsion medium in admixture with ammonium persulfate and at least one ammoniated anionic emulsifier, preferably also together with hydrogen peroxide. The polymerization process is maintained at a pH of at least about 8.5 using ammonium hydroxide. The polymerization process is conducted in the substantial absence of alkali metal ions. Polymerization is both rapid and linear. The resulting polymers have excellent heat stability and water whitening resistance.

11 Claims, No Drawings

PROCESS FOR EMULSION POLYMERIZATION OF VINYLIDENE HALIDES AND PRODUCT THEREOF

BACKGROUND OF THE INVENTION

Preparation of latices having uniformly-sized particles, particles with a bimodal size distribution, and seeded particles is known in the art. Prior art such as U.S. Pat. No. 2,520,959 describes in general terms the use of dispersing agents and catalysts in vinyl compound polymerization. However, slow initial reactions followed by nonlinear polymerization rates are a severe deficiency of prior art emulsion polymerizations using potassium persulfate, sodium persulfate or the like. Moreover, prior art vinyl polymers frequently have poor heat stability and poor water whitening resistance. A new process is desired which overcomes these prior art deficiencies.

SUMMARY OF THE INVENTION

About 50 to 100 weight percent of at least one vinylidene halide monomer is polymerized together with about 0 to 50 weight percent of at least one other unsaturated monomer copolymerizable therewith in an aqueous emulsion medium in admixture with ammonium persulfate and at least one ammoniated anionic emulsifier, preferably also together with hydrogen peroxide. The polymerization is conducted at a pH of at least about 8.5 using ammonium hydroxide and in the substantial absence of alkali metal ions. The vinylidene halide monomer has the formula

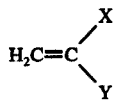

wherein X is chlorine, bromine or fluorine, and Y is hydrogen, chlorine, bromine or fluorine.

DETAILED DESCRIPTION

Vinylidene halide polymers produced by the process of this invention may contain polymerized therein from about 50 to 100 weight percent, more preferably from about 70 to 100 weight percent, of at least one vinylidene halide monomer having the formula

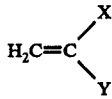

wherein X is chlorine, bromine or fluorine, and Y is hydrogen, chlorine, bromine or fluorine. More preferably X is chlorine and Y is hydrogen or chlorine. Excellent results were obtained using vinyl chloride. The vinylidene halide polymers may also contain copolymerized therein from about 0 to 50 weight percent, more preferably from about 0 to 30 weight percent, of at least one other unsaturated monomer, particularly at least one monoolefinically unsaturated monomer having a $CH_2=C<$ group or a $-CH=CH-$ group. Examples of suitable other monomers include other vinyl halides such as vinyl bromide, vinyl fluoride, vinylidene bromide, vinylidene fluoride and the like; vinyl esters such as vinyl propionate, vinyl butyrate, vinyl benzoate, vinyl laurate, isopropenyl caproate, and the like; the acrylate and methacrylate esters such as methyl acrylate; ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate, and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, the dipropyl fumarates, the dibutyl fumarates, the diheptyl fumarates, the dioctyl fumarates, the didecyl fumarates, dicyclohexyl fumarate, diphenyl fumarate and the like; the other vinyl aromatic monomers such as the vinyl toluenes, the vinyl xylenes, vinyl naphthalene, and the like; the monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl octyl ethers, vinyl cyclohexyl ether, vinyl phenyl ether, vinyl benzyl ether and the like; the allyl esters and ethers such as allyl acetate, allyl laurate, allyl benzoate, allyl methyl ether, allyl ethyl ether, and the like; vinyl cyanides such as acrylonitrile, methacrylonitrile, vinylidene cyanide and the like; alpha, beta-olefinically unsaturated carboxylic acids and anhydrides thereof such as acrylic acid, methyacrylic acid, maleic acid, itaconic acid, citraconic acid, aconitic acid, and the like; alpha, beta-olefinically unsaturated acid amides such as acrylamide, methacrylamide, N-methyl acrylamide, N,N-diethyl acrylamide, N,N-dipropyl methacrylamide, N-phenyl acrylamide, N-methylol acrylamide, N-methylol methacrylamide, N-vinyl pyrrolidone, and the like; the vinyl amines such as the vinyl pyridines, and the like and others.

Preferred copolymers contain polymerized therein from about 70 to 100 weight percent vinyl chloride and from about 0 to 30 weight percent of at least one other monomer having the formula

wherein R is hydrogen or an alkyl group containing from 1 to 4 carbon atoms, and $R^1$ is a hydrocarbon group containing from 1 to 12 carbon atoms. More preferably $R^1$ is an alkyl group containing from 1 to 8 carbon atoms. Examples of preferred other monomers include methyl acrylate, ethyl acrylate, ethyl methacrylate, vinyl acetate and the like.

Emulsifiers suitable for use in this invention are ammoniated anionic emulsifiers which are substantially metal free. Such ammoniated anionic emulsifiers preferably are used in a total amount from about 0.075 to about 5 weight parts and more, more preferably from about 0.1 to about 1 weight part, per 100 weight parts of monomer. Examples of suitable ammoniated anionic emulsifiers include (1) ammonium salts of fatty acids containing from 4 to 24 carbon atoms, more preferably from 10 to 22 carbon atoms, such as ammonium salts of rosin acids, oleic acid, palmitic and stearic acid, lauric acid, myristic acid, arachidic acid, castor acids and the like; (2) ammonium salts of fatty sulfated alcohols containing from 4 to 22 carbon atoms, more preferably from 10 to 22 carbons, such as ammonium oleyl sulfate, ammonium lauryl sulfate and the like; and (3) ammonium alkyl aromatic sulfonates containing from 1 to 22 alkyl carbon atoms and a benzene or naphthalene aromatic nucleus, such as ammonium dodecyl benzene sulfonate, ammonium cumene sulfonate, ammonium toluene sulfonate and the like. More preferred are ammonium salts of fatty acids containing from 4 to 24 carbon atoms. Excellent results were obtained using ammonium laurate.

Nonionic emulsifiers may be used to supplement the ammoniated anionic emulsifiers described heretofore at lower levels of the latter emulsifiers. Examples of nonionic emulsifiers include compounds having the formula

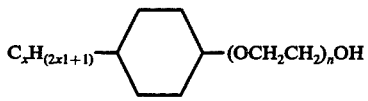

wherein x and n are at least 1, such as octylphenoxyethanol, nonylphenoxyethanol and the like; fatty alcohols such as lauryl alcohol and the like; reaction products of fatty acids with polyhydric alcohols, including monoglycerides such as glyceryl monostearate and the like; and amides of alkylol amines such as lauroyl diethanolamide and the like. Other satisfactory ammoniated anionic emulsifiers and nonionic emulsifiers are described in Becher, Emulsions: Theory and Practice (Reinhold Publishing Corporation, New York, 1965). Still other useful emulsifiers are listed in McCutcheon's Detergents and Emulsifiers (1973 North American Edition, Allured Publishing Corporation, New Jersey, 1973).

The ammoniated anionic emulsifiers described heretofore can be introduced into the polymerization mixture in any of several ways. For example, in using ammonium laurate the initial polymerization mixture may contain lauric acid which can be converted to ammonium laurate by metering ammonium hydroxide into the system. More preferably, ammonium laurate itself may be added to the polymerization system. Addition of the ammoniated anionic emulsifier is preferably made incrementally, more preferably continuously and at a substantially constant rate.

The process of this invention comprises polymerizing at least one vinylidene halide monomer defined heretofore together with about 0 to 50 weight percent of at least one other unsaturated monomer described heretofore. The polymerization is conducted in an aqueous emulsion medium in admixture with ammonium persulfate and at least one ammoniated anionic emulsifier defined heretofore, preferably also together with hydrogen peroxide. The polymerization is also conducted at a pH of at least about 8.5 and in the substantial absence of alkali metal ions.

It is essential that the polymerization process of this invention be conducted at a pH of at least about 8.5 and in the substantial absence of alkali metal ions. More preferably the reaction pH may be from about 8.5 to about 10.5, even more preferably from about 9.0 to about 10.5. A substantial absence of alkali metal ions may be defined as less than about 500 ppm, more preferably less than about 200 ppm, and even more preferably less than about 100 ppm, of sodium ions, potassium ions or the like, based upon total monomer weight. Small amounts of potassium persulfate, sodium laurate or the like can be used, provided alkali metal ion concentration does not exceed the levels just defined. However, the presence of sodium ions has been found to be significantly more deleterious to polymeric heat stability and water whitening resistance than potassium ions. Ammonium hydroxide is used to maintain reaction pH above 8.5 while simultaneously maintaining a low alkali metal ion level. Similarly, use of the ammoniated anionic emulsifiers and the nonionic emulsifiers described heretofore also contributes to a low alkali metal ion level. An ammonium persulfate catalyst may be used at a concentration from about 0.0001 to 2 weight parts, preferably from about 0.005 to 0.5 weight parts per 100 weight parts of monomer. Hydrogen peroxide may also be used at a concentration from about 0 to 0.5 weight part and more preferably from about 0.001 to 0.2 weight parts per 100 weight parts of monomer. Use of higher amounts of hydrogen peroxide than 0.5 weight parts may increase polymerization rate beyond cooling capacity of the reactor vessel. Both ammonium persulfate and hydrogen peroxide assist in maintaining the essential low alkali metal ion level. Other reaction mixture components should be similarly as free as possible of alkali metal ions. For example, water used for the aqueous reaction medium should be demineralized before use by methods well known to the art.

Reaction time required to reach a given conversion level was found to decrease substantially with increasing pH above 8.5, and polymerization rate was both rapid and linear. A small decrease in reaction time was also achieved by increasing ammonium persulfate amount; surprisingly, however, reaction time was found to decrease substantially with use of a mixture of ammonium persulfate and hydrogen peroixde. Taken together, use of pH above 8.5 and use of an ammonium persulfate/hydrogen peroxide mixture was found to substantially reduce vinylidene halide polymerization times over the prior art, thereby reducing polymerization costs significantly. For example, total time to reach a given conversion was reduced by up to 50% (e.g., from about 20 hours to 10 hours). Moreover, a substantial absence of alkali metal ions both during polymerization and in the final polymers resulted in excellent polymeric heat stability and polymeric water resistance.

The process of this invention is carried out conveniently in conventional polymerization equipment with agitation of the ingredients at a temperature from about 0° C. to 100° C. The polymerization is best carried out at a reaction temperature in the range from about 30° C. to 60° C. Slower reaction rates tend to make operations below about 20° C. very unattractive. As those skilled in the art know, lower polymerization temperatures tend to produce higher molecular weight products and higher polymerization temperatures tend to produce lower molecular weight polymers. It is also known that lower molecular weight resins soften at somewhat lower temperatures than higher molecular weight resins. The polymerization can be carried out under atmospheric, sub-atmospheric or super-atmospheric pressure.

To obtain the best polymerization characteristics, for instance, good reaction rate and no substantial decrease in catalyst activity during the polymerization period, the reaction is desirably carried out in the substantial absence of oxygen, in other words, "in a substantially oxygen-free medium." This term is applied to a polymerization in which all traces of oxygen may not have been excluded, but in which ordinary precautions are used to reduce the amount of oxygen to a minimum, e.g. below about 100 ppm. Exemplary of "ordinary precautions" are the following operations preparatory to polymerization of vinylidene halides: the water medium is charged to the reactor at 70° C., the reactor is sealed, and the contents cooled to 30° C. causing a slight vacuum which is then broken with nitrogen. The reactor is then more rigorously evacuated (about 50 mm of Hg), purged with vinylidene halide monomer to a pressure of 10 to 30 p.s.i.g., evacuated again, and then charged with the vinylidene halide monomer to be polymerized. The initiator may be added either before or after the monomer charge.

In the novel polymerization process embodied herein the best results are obtained and the most stable latex results when mild but thorough agitation is employed. Stated differently, the most stable latices result from the process enbodied herein when good mixing with low shear is employed during the course of the polymerization. Low to moderate shear mixing should not cause coagulation of the resin, but high shear mixing may cause coagulation. The use of high shear mixing may be actually a convenient way to coagulate the resin if it is desired to do so either during or after completion of the polymerization reaction.

Although the process of this invention may be employed to prepare polyvinylidene halide latices containing polymer particles of any desired size, it has been found that the most satisfactory latices are those containing particles at least 500 Angstroms in diameter. The upper limit of particle size is not critical since it depends upon the tendency of the polymer particles to settle out of the dispersion, which in turn is largely dependent upon the specific gravity of the polymer. Stable latices containing particles of polyvinyl chloride over 6,000 Angstroms in diameter have been prepared. In general, latices containing particles ranging in diameter from 500 to about 20,000 Angstroms or more appear to be most useful. Latices containing particles of smaller average size than about 500 Angstroms tend to be unstable. Particles larger than about 20,000 Angstroms tend to settle out from the latices. Moreover, the ratio of emulsifier to polymer necessary to obtain reasonable stability in small particle size (less than about 500 Angstroms) latices is so high that the polymeric properties may be deleteriously affected.

The proportion of polymer to water is not critical. For most practical purposes the volume of the polymer will be from about 20% to about 70% of the volume of the latex as a whole, usually from 30% to 60%. A distinct advantage of the process of this invention is that it is adaptable to the production of stable, relatively high solids content emulsions. In fact, it is preferred to produce emulsions containing greater than 30% solids by weight and especially containing from about 50% to 70% solids. It has been found that polyvinyl chloride resins can be prepared in stable form from recipes employing as much as 50% of monomer based on the total weight of water and monomer. The final monomer conversion is usually taken to an ultimate conversion greater than 70% and preferably greater than 90%.

The latices of this invention are comparatively stable to coagulation from heat and shear, but nevertheless it has been found that the latex tends to coagulate if subjected to high mechanical shearing forces. Therefore, it is sometimes expedient to add additional small amounts of an emulsifier defined heretofore to the emulsion to insure retention of its good shear-stable properties during subsequent handling steps such as transfer through small lines or valves, pumping, spray drying operations, and other similar mechanical, high-shear processing. This additional emulsifier is added to the emulsion at any time after termination of the polymerization reaction and prior to subsequent handling. It may be desirable to introduce this post-polymerization stabilizer just prior to venting unreacted monomer from the reactor. Generally from about 0.05 to 2 parts, preferably from 0.1 to 0.7 parts, of extra emulsifier per 100 parts of polymer is sufficient to retain the shear stability of the latex during handling.

The polyvinylidene halide latices resulting from the process of this invention may be used directly, or may be heat coagulated, freeze coagulated, spray dried, or the like. Coagulating agents such as sodium chloride, calcium chloride, calcium acetate, cadmium chloride, sodium carbonate and the like should not be used because of a tendency to increase alkali metal ion content to an undesirable level. The coagulated product may be isolated by filtration, centrifugation or decantation and may be washed and dried in conventional washing and drying equipment. Recovery encompasses the isolating step and, optionally, washing and/or drying.

Polymer latices prepared by the process of this invention may have uniformly-sized particles, particles with a bimodal size distribtuion, or seeded particles, depending on planned end use. Well known variables such as emulsifier charging rate and the like may be used to produce a desired particle size and size distribution.

Uniformly-sized Polymer Particle Latices

Uniformly-sized polymer particle emulsions may be produced by the process of this invention by introducing into the reaction mixture or forming in situ an emulsifier defined heretofore. A small amount of emulsifier may be introduced into the reaction mixture prior to initiation and the remainder charged subsequent to the initiation of polymerization and after a finite conversion of monomer to polymer. More specifically, the addition of most of the emulsifier is begun after at least about 1% and before about 50% of monomer conversion. The addition may be continued during the course of the polymerization reaction and is desirably completed before the conversion exceeds about 90–95%. In the more preferred embodiments, most emulsifier addition is effected from at least 3%, most preferably from 5 to 40% of monomer conversion.

It is convenient and advantageous to meter the emulsifer, or the reactions to form same, in an essentially continuous flow into the reaction mixture at a substantially constant or uniform rate during the above-described post-initiation addition period. The emulsifier can also be added in increments or slugs of reasonable size, but in either case, it is added in such a quantity that serves only to stabilize polymer particles present in the reaction mixture and is insufficient to initiate the formation of new polymer particles. The process described herein thus allows the original family of polymer particles to grow larger as reaction proceeds, thereby ultimately producing a latex of uniformly-sized spherical articles.

It is apparent that the process may be carried out in a routine fashion simply by (1) initiating the polymerization of vinylidene halide monomer in an aqueous medium in the presence of an emulsifier and allowing the polymerization to proceed to some finite degree of conversion thereby establishing particles, (2) determining degree of conversion by such means as measuring total solids content of the polymerization mixture, etc., and (3) then adding emulsifier in an amount insufficient to initiate new particles but sufficient to stabilize existing particles.

The amounts of emulsifier when fed continuously to the polymerization reaction at substantially a constant rate during the course of the reaction within the prescribed conversions, are insufficient to promote the nucleation of new particles, provided that the rate of conversion of monomer to polymer is reasonably normal for vinylidene halide polymerization in these systems, i.e., the rate is not abnormally affected due to catalyst poisoning, an inadvertent temperature drop or rise, monomer contamination, etc. In the rare cases of abnormal conversion rate, either too high or too low, the rate of injection of emulsifier is adjusted. The feed rate of emulsifier is decreased when monomer conversion rate is significantly below the norm and increased when conversion rate exceeds the norm.

Bimodally-sized Polymer Particle Latices

Particles with a bimodal size distribution may be produced by initiating polymerization in the presence of emulsifier using ammonium persulfate initiator optionally together with hydrogen peroxide. During the course of polymerization and at some finite degree of conversion which is equivalent to at least about a 1% conversion, preferably about a 1% to 50% conversion, of monomer to polymer, from about 2 to about 100 weight percent, more preferably 10 to 50 weight percent, of a controlled excess of emulsifier defined heretofore is added beyond the amount sufficient to stabilize the existing polymer particles. The presence of excess emulsifier causes nucleation of new polymer particles and production of a stable polymer emulsion of a mixture of at least two families of polymer particles, at least one of which is composed of particles of uniform size. Such mixtures may be used in plastisols, since it is known that mixtures of larger and smaller particles in suspension in a plasticizer, for example, possess highly desirable flow properties as taught by U.S. Pat. No. 2,553,916.

It is apparent that the foregoing process may also be carried out in a routine fashion simply by (1) initiating the polymerization of vinylidene halide in an aqueous medium in the presence of an emulsifier defined heretofore and allowing the polymerization to proceed to some finite degree of conversion, (2) determining the degree of conversion by such means as total solids measurement, etc. and (3) then adding emulsifier in an amount previously calculated to be the required excess amount for a given conversion.

Bimodally-sized polymer latices may also be produced by blending the uniformly-sized polymer latices described heretofore.

Seeded Polymer Particle Latices

The process of this invention may be used to prepare seeded polymer particles in fluid latices of high concentration. The final particles may vary in size from about 500 to 20,000 Angstrom units or more in average diameter. A suitable two-step polymerization procedure is described in detail in Powers U.S. Pat. No. 2,520,959, incorporated herein by reference, although more particle layers may be added by further repetition of the polymerization cycle described therein. Thus, three- and four-layer seeded polymer particles may be produced. Of course, the catalyst, ammoniated anionic emulsifier and minimum pH 8.5 of the present invention must be used in place of Powers much more general teachings.

The procedure for preparing a seeded polymer latex may comprise two steps: (a) A seed latex is prepared by the process of this invention as an aqueous dispersion containing a known quantity of polymer particles of an average diameter above 100 Angstrom units but below that of the 500–20,000 Angstrom unit or larger particles of the final fluid polymer latex. The uniformly-sized particle procedure described heretofore may be used for step (a). The step (a) particles present in the dispersion may be from about 0.05 to about 50 weight percent of polymer present in the final fluid polymer latex. (b) Additional monomer defined heretofore is added to the step (a) seed latex, together with catalyst and emulsifier defined heretofore according to the emulsifier proportioning criteria of U.S. Pat. No. 2,520,959. The additional monomer is polymerized to form the final fluid polymer latex having polymer particles of a uniform size from about 500 to 20,000 Angstrom units or more in average diameter.

While the process of this invention is not limited to a specific emulsion polymerization technique it has been found particularly useful in preparing seeded polymer latices to employ pre-emulsification of the vinylidene halide. The reactor is charged with an amount of water, a portion of the emulsifier and a portion of the initiator sufficient to initiate the polymerization. The reactor is then heated to a temperature sufficient to initiate the polymerization and an amount (up to about 15%) of a monomer premix containing the monomers, water and emulsifier charged to the reactor. After the initial monomer charge has been allowed to react for a period of time the remainder of the monomer premix is proportioned into the reactor. The rate of proportioning is governed by the polymerization temperature, the initiator system and the monomers being polymerized. At the completion of the proportioning more initiator is added and the reactor and the latex heated with agitation for an additional period. If overpolymerization of the vinylidene halide monomer is desired, the vinylidene halide monomer may be charged after the completion of the proportioning or at some point prior to the completion of the proportioning step.

The vinylidene halide polymers produced by the process of this invention may contain the usual compounding ingredients known to the art such as fillers, stabilizers, opacifiers, lubricants, processing aids, impact modifying resins, plasticizers, anti-oxidants and the like.

The following examples illustrate the present invention more fully.

EXAMPLES

Test Procedures

Water whitening resistance was measured as follows. 100 weight parts of resin to be tested was compounded with 62 weight parts of plasticizer and 3 weight parts of stabilizer to form a plastisol. A 0.020 inch plastisol film was heated for 5 minutes at 350°0 F. Each film sample was exposed at 75° F. for 72 hours to 100% relative humidity; film whitening typically occurred during this time. A film sample was exposed thereafter at 75° F. to 50% relative humidity to allow recovery of film clarity. Reflectance was measured after 0,1,2 and 3 hours exposure to 50% relative humidity. Measurements were made using a Photovolt Photoelectric Reflection Meter Model 610 (Photovolt Corporation, New York, N.Y.) and an 89% reflectance working standard. Percent clarity recovery was measured by dividing a test reflectance value by the reflectance value before moisture exposure and multiplying the quotient by 100. More water-resistant samples had higher percent clarity recovery numbers.

Heat stability was measured by compounding 100 weight parts of resin to be tested with 62 weight parts of plasticizer and 3 weight parts of stabilizer to form a plastisol. A 0.020 inch plastisol film was heated for 5 minutes at 350° F. Each film sample was heated thereafter for 45 minutes at 375° F. in a circulating air oven. Reflectance was measured using a Photovolt Photoelectric Reflection Meter Model 610 (Photovolt Corporation, New York, N.Y.) and an 89% reflectance working standard. Lower reflectance readings indicated poorer film heat stability. In other words, as a film sample darkened the reflectance reading decreased.

Polymerization Procedure

Uniform particle-sized polyvinyl chloride latices in examples 1 to 7 were prepared by the process of this invention using the recipe in Table 1. All polymerizations were carried out in a 15 gallon reactor having one 8-inch marine blade located approximately 2.5 inches from the bottom and 3 inches off center. Agitation speed was about 140 rpm.

A 7 wt.% ammonium laurate solution was prepared by mixing 0.7 weight part (0.476 mole) of lauric acid with 9.3 weight parts of demineralized water at 50° C. 0.304 Part of a 28 wt.% solution of ammonium hydroxide in water was added slowly with stirring to the water-lauric acid mixture. An ammonium laurate solution formed and was cooled to room temperature. The solution had a 9.8 pH and a 1.43 $NH_3$/lauric acid molar ratio.

Reactor charging was performed as follows. Demineralized water and a portion (0.0009 weight parts) of ammonium laurate solution were weighed into the reactor, which was thereafter closed and evacuated to a minimum of 71 mm Hg. The vacuum was maintained for about 15 minutes and then broken with nitrogen. The reactor was again evacuated to a minimum of 71 mm Hg for 15 minutes. Agitation was started, and recipe amounts of hydrogen peroxide and vinyl chloride were charged to the reactor.

Reactor temerature was raised to 40° C. Immediately thereafter the recipe amount of ammonium persulfate dissolved in 1.7 weight parts distilled water was charged to the reactor, followed by addition of the recipe amount of $NH_4OH$ in 1.7 weight parts distilled water. When the reaction reached 22% conversion, proportioning of the remaining ammonium laurate solution into the reactor was begun so that all of the emulsifier was added by the time the reaction was terminated. Samples of the reaction mixture were taken periodically during polymerization to determine conversion by measuring total solids. When reaction vessel pressure dropped 15 psi (about 85% conversion) the reactor was cooled to 22° C. and vented. The amount of coagulum and the condition of the inside of the reactor were noted. The latices of examples 5 to 7 were spray dried using a Bowen Model BE-904 drier. Polymerization data is summarized in Table I.

TABLE I

| EXAMPLE | 1 | 2 | 3 | 4 | 5 | 6 | 7 |
|---|---|---|---|---|---|---|---|
| Recipe (Wt. Parts) | | | | | | | |
| Vinyl Chloride | 100 | 100 | 100 | 100 | 100 | 100 | 100 |
| Demineralized Water | 200 | 200 | 200 | 200 | 200 | 200 | 200 |
| Ammonium Laurate | 0.7 | 0.7 | 0.7 | 0.7 | 0.7 | 0.7 | 0.7 |
| Ammonium Hydroxide | 0.06 | 0.06 | — | — | 0.462 | — | — |
| Ammonium Persulfate | 0.05 | 0.05 | 0.05 | 0.1 | 0.05 | 0.03 | 0.03 |
| Hydrogen Peroxide | 0.002 | — | 0.015 | 0.002 | — | — | — |
| Sodium Hydroxide | — | — | — | — | — | 0.37 | — |
| Potassium Hydroxide | — | — | — | — | — | — | 0.48 |
| Polymerization Data | | | | | | | |
| Initial pH | 9.0 | 9.2 | 5.1 | 6.8 | 9.5 | 11.0 | 11.1 |
| Initiation Occurred | Yes | Yes | No | No | Yes | Yes | Yes |
| Reaction time (Hrs) | 8 | 12 | — | — | 15 | 12.5 | 14.5 |
| Final pH | 9.3 | 9.2 | — | — | 9.9 | 12.5 | 12.1 |
| Alkali Metal Ion Content (ppm) | — | — | — | — | None | ≈1700 | ≈2600 |
| % Clarity Recovery | — | — | — | — | 89 | 13 | 2 |
| Heat Stability* | — | — | — | — | 81 | 35 | 26 |

*Reflectance after 45 minutes at 375° F.

Example 1 was conducted according to the process of this invention using ammonium persulfate, hydrogen peroxide and a pH above 8.5. The polymerization of example 1 was found to be both rapid and linear. The example 2 polymerization proceeded somewhat more slowly but at a linear rate in the absence of hydrogen peroxide. Initiation did not occur in examples 3 or 4, since pH of the reaction mixtures was below the pH 8.5 minimum required in the process of this invention. However, when the example 4 reaction mixture was raised to a pH of 8.7 by addition of ammonium hydroxide, initiation occurred promptly with reaction completion in about 9 hours (final pH was about 8.9).

Polymer samples from examples 5 to 7 were recovered and tested for % clarity recovery and heat stability. Example 5 was conducted according to the process of this invention, and both polymeric water resistance (measured by % clarity recovery) and heat stability were excellent; sample 5 darkened only slightly even after 60 minutes at about 350° F in a circulating air oven. pH control in examples 6 and 7 was maintained using sodium hydroxide and potassium hydroxide and resulted in polymeric alkali metal ion contents (ppm based on total monomer weight) not suitable in this invention. Both polymeric water resistance and heat stability of example 6 and 7 polymers were poor — both samples darkened substantially after less than 15 minutes at about 375° F in a circulating air oven, and were very dark after 45 minutes at that temperature.

The latices produced by the process of this invention may be used directly or in powdered form, in plastisol form or the like for purposes well known to the man skilled in the art, including floor tile, toys, upholstery, foamed wall coverings and the like.

We claim:

1. A process for preparing a polymer, said process comprising:
(A) polymerizing (1) from about 50 to 100 weight percent of at least one vinylidene halide monomer having the formula

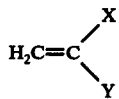

wherein X is chlorine, and Y is hydrogen or chlorine, together with (2) from about 0 to 50 weight percent of at least one other unsaturated monomer copolymerizable therewith,
(B) in an aqueous emulsion medium in admixture with (1) an initiator consisting essentially of ammonium persulfate or a mixture of ammonium persulfate and hydrogen peroxide, and (2) at least one ammoniated anionic emulsifier, said emulsifier being substantially metal-free,
(C) said polymerization process being maintained at a pH of at least 8.5 using ammonium hydroxide, and
(D) polymerization being conducted in the presence of less than 100 ppm of alkali metal ions based upon total monomer weight, the amount of alkali metal ions also being less than 100 ppm after polymerization is complete.

2. A process of claim 1 wherein said other monomer is monoolefinically unsaturated, and said polymerization process is conducted at a pH from 8.5 to 10.5.

3. A process of claim 2 wherein said other monomer has the formula

wherein R is hydrogen or an alkyl group containing from 1 to 4 carbon atoms, and $R^1$ is a hydrocarbon group containing from 1 to 12 carbon atoms.

4. A process of claim 2 comprising initiating polymerization in the presence of said emulsifier and subsequently adding at about a 1 to 50% conversion an amount of said emulsifier sufficient to stabilize the existing polymer particles but substantially insufficient to cause nucleation of any new particles while the polymerization is still progressing to produce a stable, uniform-sized particle emulsion.

5. A process of claim 4 wherein said ammoniated anionic emulsifier is present in a range from about 0.075 to about 5 weight parts per 100 weight parts of monomer.

6. A process of claim 5 wherein said emulsifier is added incrementally.

7. A process of claim 6 wherein the incremental addition of said emulsifier is essentially continuous and at a substantially constant rate.

8. A process of claim 7 wherein X is chlorine, and Y is hydrogen or chlorine.

9. A process of claim 8 wherein the ammoniated anionic emulsifier is the ammonium salt of a fatty acid containing from 4 to 24 carbon atoms.

10. A process of claim 9 wherein the vinylidene halide is vinyl chloride, the ammoniated anionic emulsifier is ammonium laurate, and hydrogen peroxide is used together with said ammonium persulfate.

11. A process of claim 1 wherein said polymer is recovered from said aqueous emulsion medium.

* * * * *